(12) United States Patent
Suzuki et al.

(10) Patent No.: US 7,729,312 B2
(45) Date of Patent: Jun. 1, 2010

(54) ROUTER APPARATUS, ROUTE INFORMATION DISTRIBUTING METHOD, AND COMMUNICATIONS SYSTEM

(75) Inventors: Toshihiro Suzuki, Yokohama (JP); So Ishida, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 932 days.

(21) Appl. No.: 10/920,366

(22) Filed: Aug. 18, 2004

(65) Prior Publication Data

US 2005/0047348 A1 Mar. 3, 2005

(30) Foreign Application Priority Data

Aug. 27, 2003 (JP) ............................. 2003-209144

(51) Int. Cl.
*H04W 4/00* (2009.01)
(52) U.S. Cl. ...................... 370/331; 370/353; 370/401
(58) Field of Classification Search ......... 370/328–331, 370/338, 348, 352, 353, 389, 392, 393, 395.32, 370/395.4, 236–238, 401, 465, 466, 469, 370/474, 254; 709/245, 246; 455/436, 449, 455/432.1, 445
See application file for complete search history.

(56) References Cited

U.S. PATENT DOCUMENTS

| | | | | |
|---|---|---|---|---|
| 7,212,531 | B1 * | 5/2007 | Kopelman et al. .......... | 370/392 |
| 2004/0004967 | A1 * | 1/2004 | Nakatsugawa et al. ...... | 370/338 |
| 2004/0111529 | A1 * | 6/2004 | Parmar ...................... | 709/245 |
| 2004/0246931 | A1 * | 12/2004 | Thubert et al. .............. | 370/338 |

FOREIGN PATENT DOCUMENTS

| | | |
|---|---|---|
| JP | 63-155839 | 6/1988 |
| JP | 2002-359638 | 12/2002 |

OTHER PUBLICATIONS

Yoshiaki Kitaguchi et al, "Operating multi-homed network with IPv6" INTEC Systems Laboratory, May 21, 1999, vol. 99, No. 44, pp. 37-42.
Takeshi Kajit et al, "A proposal of routing system that depends on source IP address Solution of routing issues on the regional IX" Nara Institute of Science and Technology, Nov. 21, 1997, vol. 97, No. 111, pp. 7-12.
Gary Malkin, et al.; Minnear/Ipsilon Networks R Hinden/Ipsilon Networks R: "IGRPng for IPv6; draft-minnear-igrpng-00. txt;" IETF Standard-Working-Draft, Internet Engineering Task Force, IETF, CH, Nov. 1996, XP015032517 ISSN: 0000-0004. (p. 1-28).

(Continued)

*Primary Examiner*—Ian N Moore
(74) *Attorney, Agent, or Firm*—Oblon, Spivak, McClelland, Maier & Neustadt, L.L.P.

(57) ABSTRACT

A router apparatus used in an IPv6 multihome network and capable of exchanging a network prefix as route information with an adjacent router is disclosed. The router apparatus comprises a pair information generator (52) configured to associate a prefix assigned from the network with a default route to generate a pair information item, and a routing protocol processor (51) configured to distribute the pair information item of the prefix and the associated default route to the adjacent router using a routing protocol.

5 Claims, 10 Drawing Sheets

OTHER PUBLICATIONS

Gary Scott Malkin, et al.; Malkin Xylogics R Minnear Ipsilon Networks G: "RIPng for IPv6; rfc2080. txt" IETF Standard, Internet Engineering Task Force, IETF, CH, Jan. 1997 XP015007854 ISSN: 0000-0003. (p. 1-19).

Fred Baker, et al.; Baker Cisco Systems P Savola CSC/Funet F: "Ingress Filtering for Multihomed Networks draft-savola-bcp38-multihom ing-update-00 draft-savola-bcp38-multihoming-update-00. txt" IETF Standard-Working-Draft, Internet Engineering Task Force, IETF, CH, May 22, 2003, XP015005158 ISSN: 0000-0004. (p. 1-17).

Jun-ichiro itojun, et al; Hagino Research Laboratory J et al: "IPv6 Multihoming Support at Site Exit Routers; rfc3178. txt " Standard, Internet Engineering Task Forces, IETF, CH, Oct. 2001 (Jan. 2001) XP015008959 ISSN: 0000-0003. ( p. 1-13).

Internet-Draft Route Optimization for MN based on PD, Individual Submission Internet Draft, Kyeong-Jin Lee et al., Jun. 22, 2003, (p. 1-8).

Toshihiro Suzuki, "High Efficient Routing Management for Moving Network", IEICE Technical Report, vol. 103, No. 201, Jul. 2003, 2 cover pages and pp. 63-66 (with English Abstract).

* cited by examiner

ROUTER APPARATUS, ROUTE INFORMATION DISTRIBUTING METHOD, AND COMMUNICATIONS SYSTEM

BACKGROUND OF THE INVENTION

The present invention relates to a router apparatus used in an IPv6 multihome network, a route information distributing method implemented by the router apparatus, and a communications system including the router apparatus.

Multihome environments are structured in IP networks. In an IP multihome network, an end site, such as a local area network of a company or a university, is connected to multiple Internet service providers (ISPs). By establishing connection to multiple upstream resources, load distribution is guaranteed and the reliability is improved. An example of such a multihome technique is disclosed in RFC (Request for Comments) 2260 and RFC 3178 documented by the Internet Engineering Task Force (IETF), which is a private organization for promoting standardization of Internet techniques.

The Internet Protocol version 6 (IPv6) address has a bit length four times as large as the conventional IPv4 address, and a global IP address can be assigned to a number of machines and pieces of equipment. In IPv6, Internet service providers (ISPs) assign 48-bit prefixes to an end site, which is a site of an end user or a subscriber contracted with the Internet service providers, unlike the IPv4. The site assigns 64-bit prefixes to host apparatuses arranged in that site.

FIG. 1 is an example of the conventional IPv6 multihome network. Site 100 is connected to two Internet service providers (ISP_a and ISP_b) 110 and 120. A host apparatus 50 located in the site 100 is connected to the Internet service providers (ISP_a and ISP_b) 110 and 120 via a router (not shown).

The host 50 has the prefixes assigned by the Internet service providers (ISP_a and ISP_b) 110 and 120. The prefixes are, for example, ISP_a 2002:1000:1000::/48, and ISP_b 2002:2000:2000::/48, respectively, where "/48" represents the IPv6 prefix length. The prefix is divided every 16 bits, and expressed as a hexadecimal value using colons.

FIG. 2 shows the IPv6 address structure in the site. The IPv6 address consists of a 48-bit prefix 151 assigned from an Internet service provider (ISP), a 16-bit subnet ID 152 assigned to a LAN in the site, and a 64-bit host address 153 for identifying each host apparatus used in the LAN.

The host 50 in the site 100 has multiple IP addresses with different prefixes, as illustrated in FIG. 1. In this example, the host 50 has the following IP addresses:

FEC0:1000:1000:0001:0011:2233:4455:6677,
2002:1000:1000:0001:0011:2233:4455:6677, and
2002:2000:2000:0001:0011:2233:4455:6677.

The IP address starting from "FEC0::" is a site local address given by a site manager, which is unique within a specific area defined as "site".

In the IPv6 multihome environment, the number of bits of the prefix assigned by an Internet service provider (ISP) to a site is fixed at 48 bits, such that address modification becomes the minimum when the site changes the connected ISP.

In many sites, each router creates a routing table using a routing protocol, such as RIPng (Routing Information Protocol next generation) defined in RFC 2080 or OSPF (Open Shortest Path First) defined in RFC 2740. All the packets addressed outside the site are transmitted collectively using a route called a "default route" having a length of 0 bits (0.0.0.0/0) because these packets are simply supplied to a gateway (GW) router, which is a connection node between the multihome site and an Internet service provider. The default route is a general-purpose route used when no route information is found.

An ordinary in-site route is generated by the adjacent router of this link, and delivered in the site. In contrast, the default route is created by a gateway provided at the connection node between the site and the ISP, and delivered to each of the routers located in the site using a routing protocol. Upon receiving a packet, each router checks the destination address. If there is a corresponding route, that is, if the destination address is in the site, then the packet is transmitted in that direction. On the other hand, if there is no corresponding route, that is, if the destination address is outside the site, then the packet is output to the default route.

In this manner, each gateway (GW) router connected to an associated ISP creates a default route for in-site routing. With the current IP routing protocol, an appropriate route is determined based on distance when multiple default routes exist. Accordingly, a packet addressed to outside of the site is supplied to the nearest gateway router located closest to the sender.

Meanwhile, RFC 2267 provides an ingress filter, which checks the source address of a packet transmitted from a site and rejects the packet if the packet does not use the address prefix given by the ISP. According to this policy, if a packet is supplied through the in-site default route to a gateway router that does not correspond to the prefix, this packet is discarded by the ingress filter at the ISP.

FIG. 3 illustrates the packet filtering. In the site 100, a gateway router a (GWa) 51, which is a connection node to ISP_a 110, and a gateway router b (GWb) 52, which is a connection node to ISP_b 120 are provided. A router Ra 53 is connected to the gateway router a (GWa) 51. A router Rb 54 is connected to the router Ra 53 and the gateway router b (GWb) 52. A host 50 is connected to the router Rb 54.

The host 50 can generate a source address using a prefix 2002:1000:1000::/48 assigned the ISP_a 110, which is referred to as address A, and another source address using a frefix 2002:2000:2000::/48 assigned by the ISP_b 120, which is referred to as address B. The host 50 can set one of the addresses A and B as the source address when transmitting a packet.

When a packet is transmitted from the host 50 to outside of the site 100, the packet is first received at the router Rb 54, and supplied to the gateway router b (GWb) 52 through the shortest default route (with distance 1 in this example). If, in this case, the prefix 2002:1000:1000::/48 assigned by ISP_a 110 is used in the source address, this packet is discarded by the ingress filter of ISP_b 120.

To avoid this problem, RFC 3178 provides a technique for preventing undesirable packet from being discarded at the ingress filter, as illustrated in FIG. 4. With this technique, negotiation is manually made between a multihome site and an ISP, and static IP tunnels are provided between the gateway router a (GWa) 51 and ISP_b 120, and between the gateway router b (GWb) 52 and ISP_a 110. The gateway routers 51 and 52 check the source address of a packet to send this packet to the correct ISP.

JP 2002-359638A discloses a router system capable of automatically setting a temporary default route upon linking up of the port when activating a router. This technique can improve the reliability of switching operations of a routing table.

The technique using the static IP tunnel defined in RFC 3178 has a problem in that a redundant route may be generated. FIG. 5 illustrates an example of such a redundant route. When a packet is transmitted from the host "a" (50) to host "b" (60) located outside the site, the packet may be delivered through the IP tunnel connecting the gateway router b (GBb) 52, ISP_b 120, and ISP_a 110.

To be more precise, if the host a (50) transmits a packet to host b (60) using the prefix assigned from ISP_a 110 as the source address, the packet is first sent to the gateway router b (GWb) 52 located nearest to the destination address. This packet is further supplied to ISP_a 110 via ISP_b 120 through the static tunnel.

This means that the packet is transmitted through a redundant route, instead of using the optimum (shortest) route (extending via ISP_b 120, ISP_c 130, and the Internet 200 to the host b (60) in this example).

Using a static tunnel is also disadvantageous in a dynamically changing environment, such as in multihome mobile networks. Whenever the connection point to the ISP changes, the gateway address and the address prefix of the multihome site change, which makes it difficult to maintain the IP tunnel provided between the ISP and the gateway. No technique has been proposed so far to automatically supply such a dynamic change in address prefix to the router in the site.

SUMMARY OF THE INVENTION

The present invention is conceived to overcome the above-described problems, and it is an object of the present invention to provide a router apparatus that can improve the packet transmission efficiency, without taking a redundant route in an IPv6 multihome network.

It is also an object of the present invention to provide a route information distributing method for distributing route information to a router apparatus in an IPv6 multihome network, and a communications system using a router for an IPv6 multihome network.

To achieve the objects, in one aspect of the invention, a router apparatus used in an IPv6 multihome network and capable of exchanging a network prefix as route information with an adjacent router is provided. The router apparatus comprises a pair information generator configured to associate a prefix assigned from the network with a default route to generate a pair information item, and a routing protocol processor configured to distribute the pair information item of the prefix and the associated default route to the adjacent router using a routing protocol.

In a preferable example, the router apparatus may further comprise a routing table configured to set an address generation availability bit and a default route availability bit for the prefix, wherein the routing protocol processor is configured to read the address generation availability bit and the default route availability bit from the routing table, and determine a route based on the reading result.

In this case, if the default route availability bit represents the availability of the default route, the routing protocol processor enters the default route, together with the prefix and a next hop of a packet, in the routing table.

With this router apparatus, a default route can be set appropriately corresponding to the prefix of each source address. The router apparatus can determine the prefix used in the site, and correctly transmit a packet to an entity that assigns the prefix. The packet can be transmitted without using a redundant route formed by an IP tunnel. Consequently, the packet transmission efficiency is improved.

In another aspect of the invention, a router apparatus located in a mobile network that is connected to a node in a core network and is moving dynamically while changing the node is provided. The router apparatus comprises prefix changing means configured to update only a prefix assigned hierarchically to a mobile terminal located in the mobile network whenever the node changes as the mobile network moves.

In a preferred example, the router apparatus further comprises distribution means configured to distribute a pair information item of the updated prefix and an associated default route to an adjacent router in the mobile network using a routing protocol.

In still another aspect of the invention, a method of distributing route information used in an IPv6 multihome network capable of exchanging a prefix as route information among adjacent routers is provided. The method comprises the steps of (a) associating a prefix assigned from the network with a default route to generate a pair information item, and (b) distributing the pair information item to the adjacent routers using a routing protocol.

In yet another aspect of the invention, a route information distributing method comprises the steps of:
(a) connecting a mobile network to a connection node of a core network;
(b) updating only a prefix assigned hierarchically to a mobile network located in the mobile network whenever the connection node changes as the mobile network moves;
(c) associating the updated prefix with a default route to make a pair; and
(d) distributing the pair to an adjacent router in the mobile network using a routing protocol.

BRIEF DESCRIPTION OF THE DRAWINGS

Other objects, features, and advantages of the invention will become more apparent from the following detailed description when read in conjunction with the accompanying drawings, in which FIG. 1 schematically illustrates an example of the conventional IPv6 multihome network.

DETAILED DESCRIPTION OF THE PREFERRED EMBODIMENT

The present invention is described in detail below in conjunction with the attached drawings.

Figure 1:
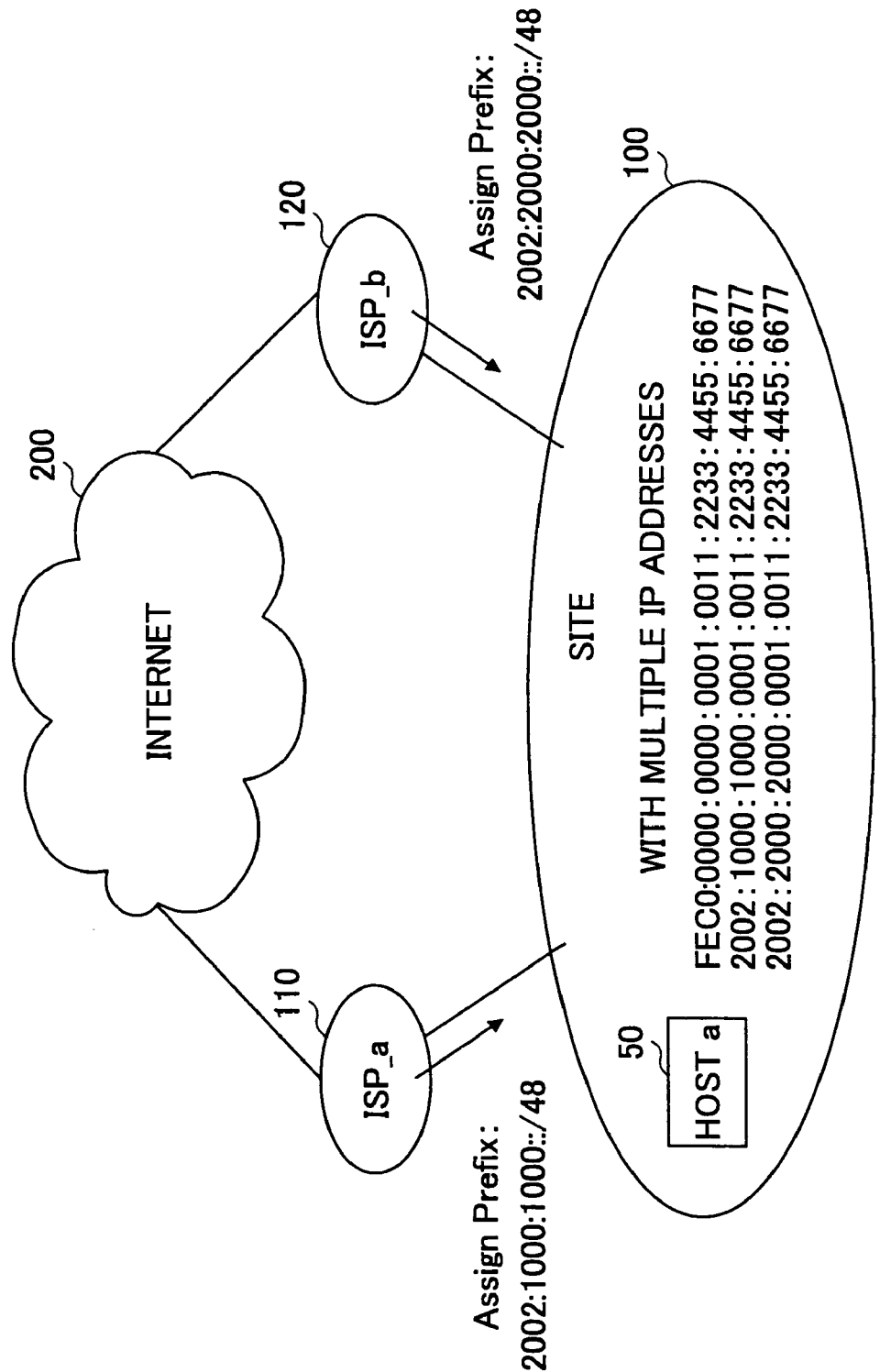
Figure 2:
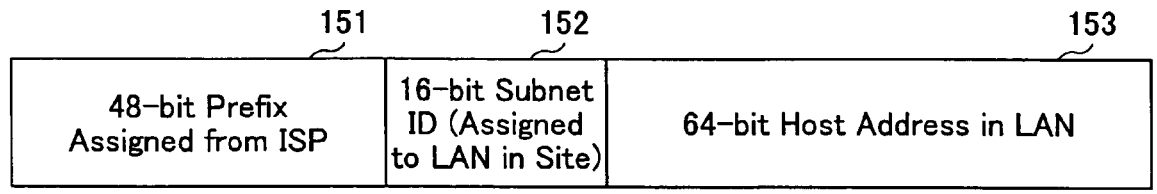
FIG. 2 is a diagram illustrating an IPv6 address structure used in a site.
Figure 3:
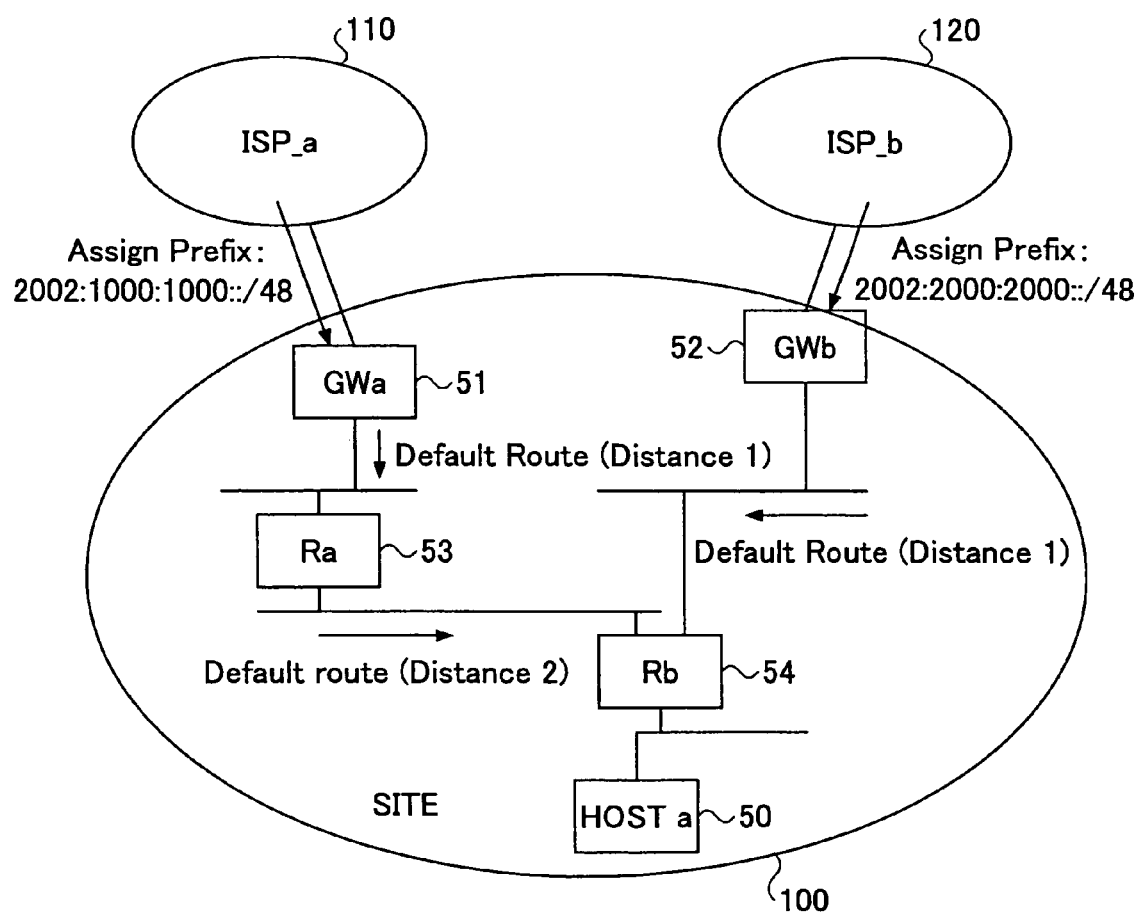
FIG. 3 is a schematic diagram used to explain packet filtering or packet discard at the ingress filter of an ISP.
Figure 4:
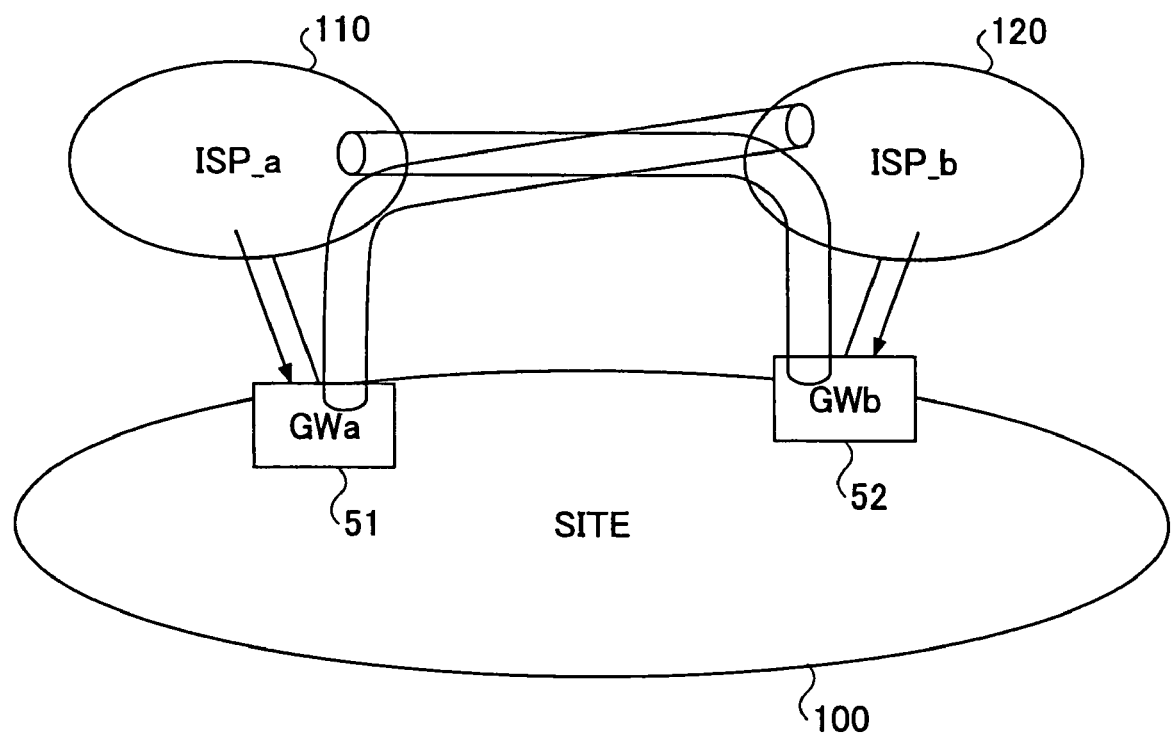
FIG. 4 schematically illustrates an example of static tunnel provided to prevent a packet from being undesirably discarded at the ingress filter.
Figure 5:
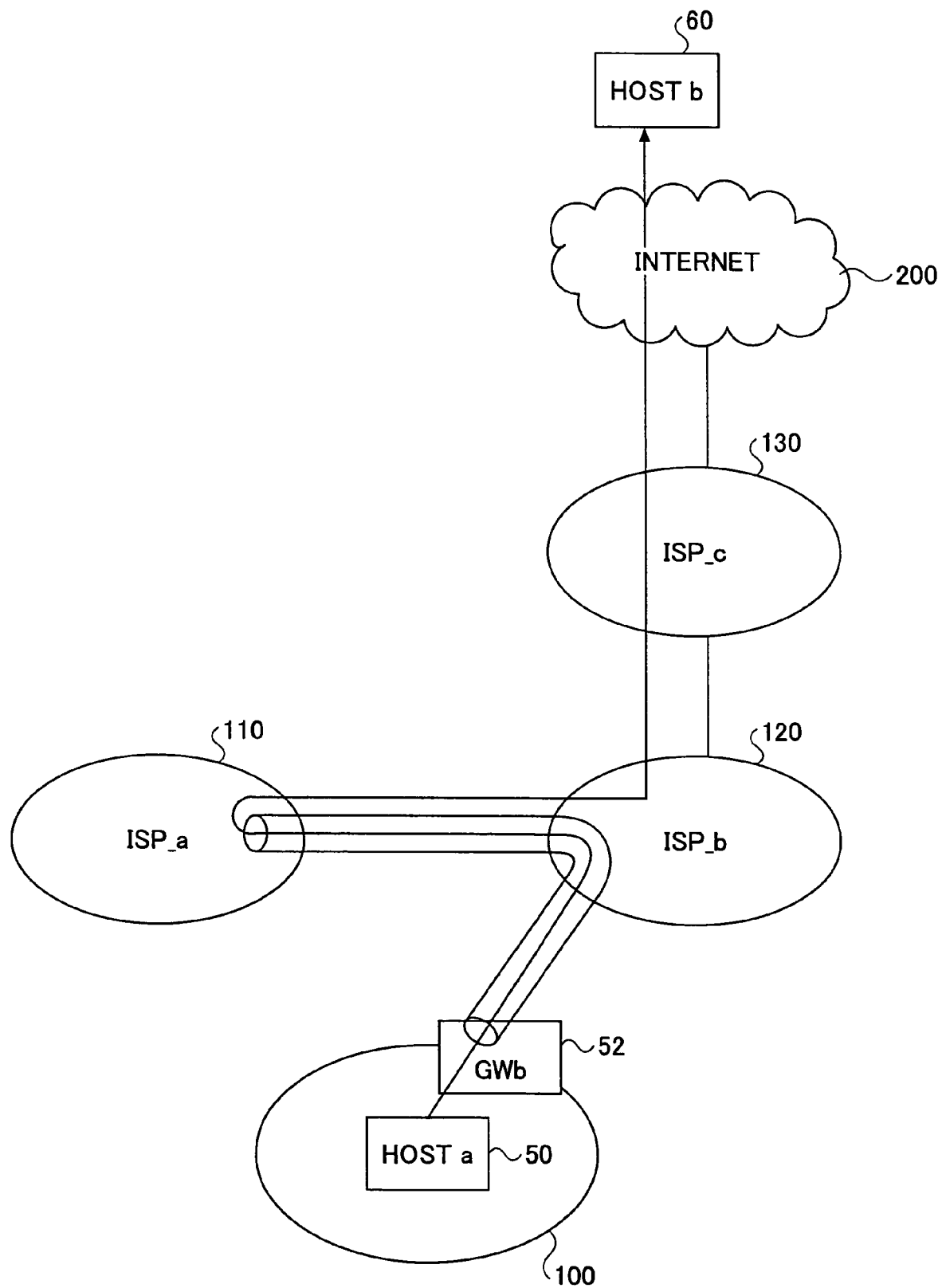
FIG. 5 is a schematic diagram illustrating a problem of packet transmission through a redundant route in the IPv6 multihome network.
Figure 6:
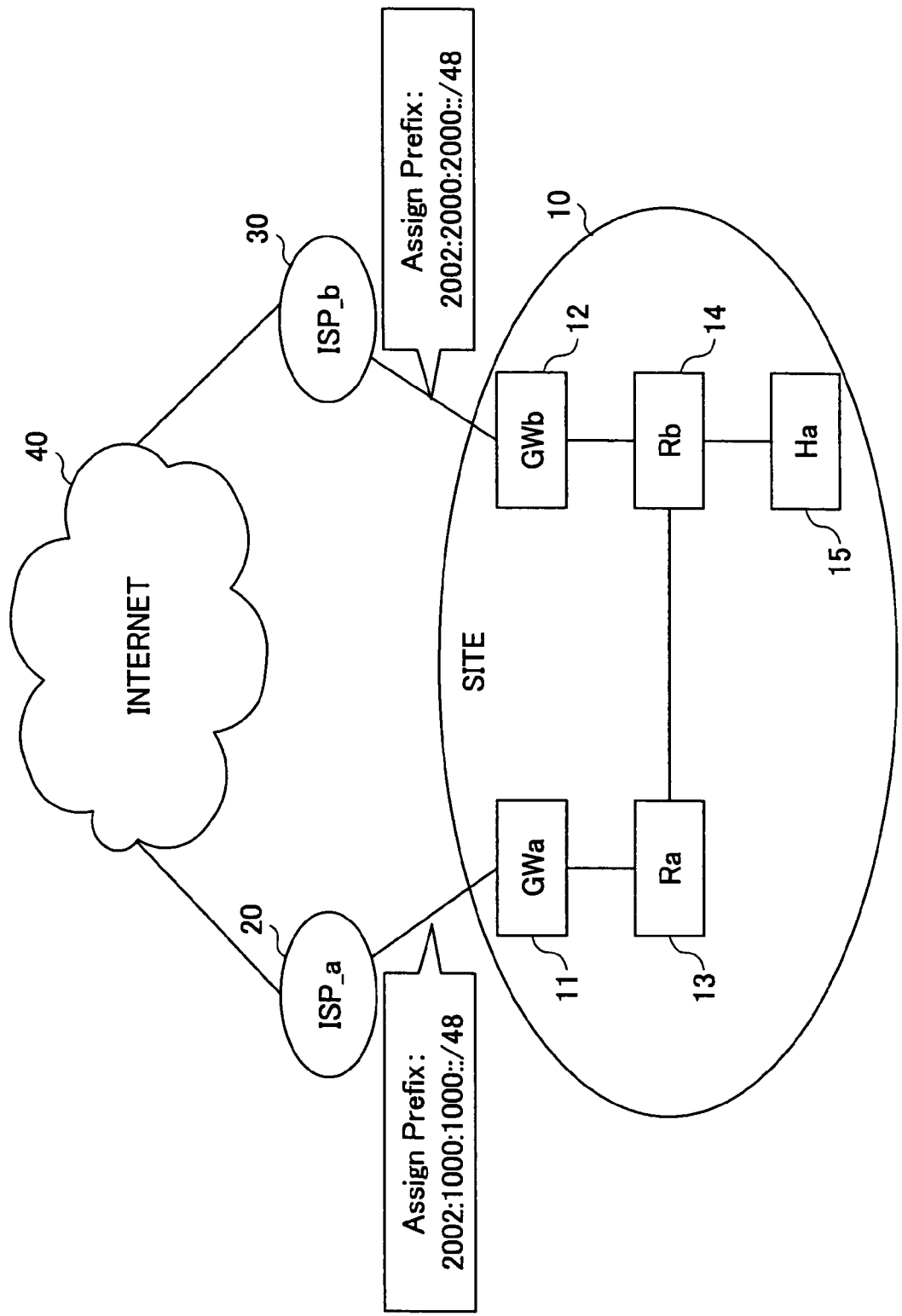
FIG. 6 schematically illustrates a communication system to which the route information distributing method according to the first embodiment of the invention is applied.

FIG. 6 is a schematic diagram illustrating the structure of a communication system according to the first embodiment of the invention.

The communication system illustrated in FIG. 6 comprises an IPv6 multihome site (hereinafter, simply referred to as a "site") 10 and Internet service providers (IPS_a and IPS_b) 20 and 30.

The site 10 includes a gateway router a (GWa) 11, which is a connection node to the ISP_a 20, and a gateway router b (GWb) 12, which is a connection node to the ISP_b 30. The site 10 also includes a router Ra 13 connected to the gateway router (GWa) 11, a router Rb 14 connected to the gateway router (GWb) 12, and a host Ha 15. The host 15 is a computer with an IPv6 address.

The ISP_a 20 assigns a 48-bit address prefix to the site 10. Similarly, the ISP_b 30 assigns a 48-bit address prefix to the site 10. In this example, the prefix assigned by ISP_a 20 is 2002:1000:1000::/48, and that assigned by ISP_b 30 is 2002:2000:2000::/48.

Each of the apparatuses 11-15 located in the site 10 adds a 16-bit LAN ID and a 64-bit apparatus ID (or interface ID) to the assigned 48-bit prefix, and automatically generates a 128-bit global IPv6 address.

In this embodiment, each of the gateway routers (GWa and GWb) 11 and 12 associates the address prefix with a default route to make a pair information item, and supplies the address prefix/default route pair to the adjacent routers in the site 10 using a routing protocol. The gateway router (GWa) 11 and the gateway router (GWb) 12 have basically the same structure and the same functions, and therefore, explanation is made of only the gateway router (GWa) 11 below.

Figure 7:
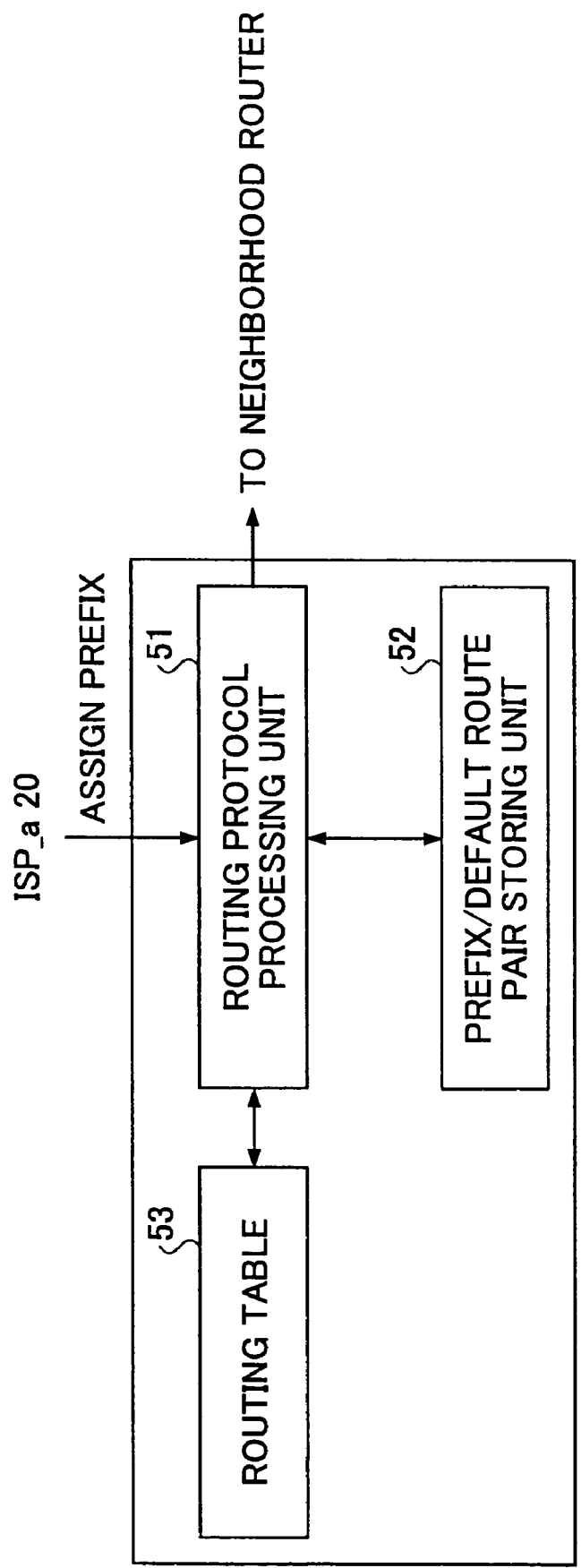
FIG. 7 is block diagram of a gateway router used in the communication system according to the first embodiment of the invention.

FIG. 7 is a schematic block diagram of the gateway router (GWa) 11 according to the first embodiment of the invention. The gateway router (GWa) 11 includes a routing protocol processing unit 51, a prefix/default route pair storing unit 52, and a routing table 53.

The prefix/default route pair storing unit 52 stores the prefix in association with the default route, which make a prefix/default route pair. When a default route is used, the routing protocol processing unit 51 checks the source address of a packet, and selects the optimum default route for the packet with reference to the pair information items of the address prefixes and the default routes stored in the prefix/default route pair storing unit 52. The routing protocol processing unit 51 supplies the pair information item of the prefix and the corresponding default route to the adjacent routers in the site 10 using router advertisement defined in RFC 2461.

The routing table 53 describes route table entries (RTEs). In this embodiment, a default route availability bit and an address generation availability bit are set in each RTE, which are described in more detail below with reference to FIG. 9.

Figure 8:
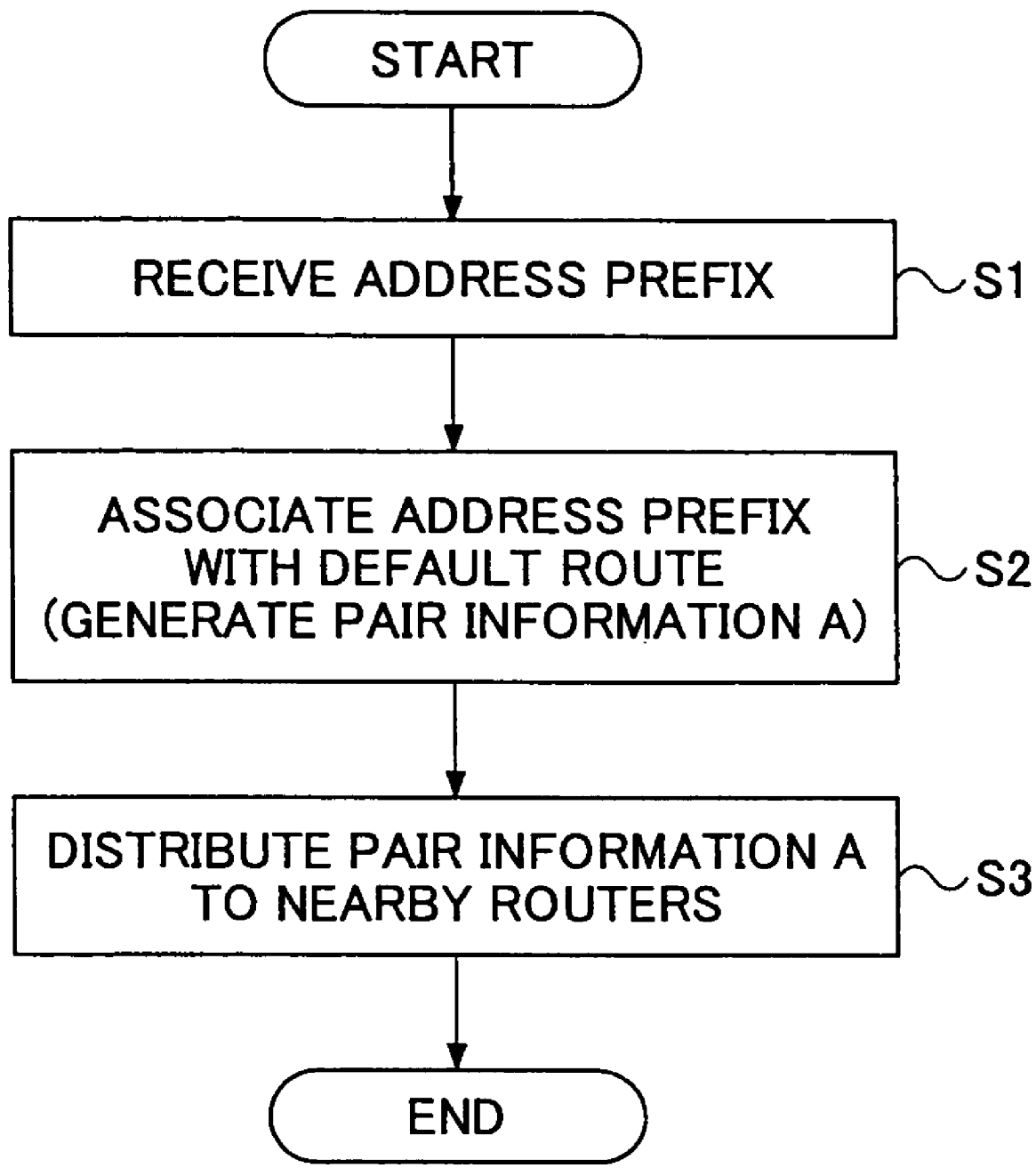
FIG. 8 is a flowchart showing the operations carried out by the gateway router a (GWa) according to the first embodiment of the invention.

FIG. 8 is a flowchart of the operations of the gateway router (GWa) 11. First, the prefix/default route pair storing unit 52 receives a 48-bit address prefix from the ISP_a 20 via the routing protocol processing unit 51 (in step S1). The address prefix is assigned to the gateway router (GWa) 11 by the ISP_a 20 using, for example, a DHCP message.

The prefix/default route pair storing unit 52 associates the address prefix with a corresponding default route to generate a pair information item A, and stores the pair information item in a prescribed memory area (in step S2). The pair information item A of the address prefix and the associated default route is supplied to the routing protocol processing unit 51. The routing protocol processing unit 51 transmits a message for distributing the pair information item A to the adjacent routers in the site 10 (in step S3).

At this time, a default route availability bit and an address generation availability bit are preferably set in the route table entry (RTE) of the routing table 53. This arrangement allows either the default route function or the automatic address setting function based on the distributed address prefix to be used selectively and independently.

Figure 9:
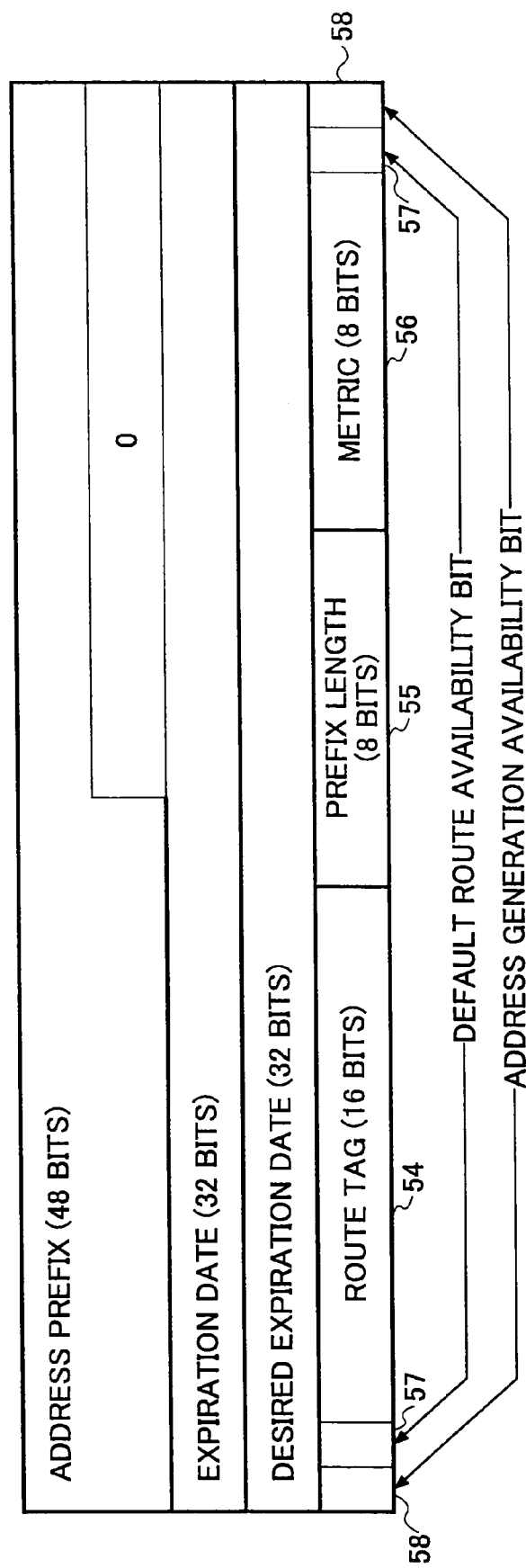
FIG. 9 shows the default bit availability bit and the address generation availability bit expressed in an RTE (Route Table Entry) packet format of the RIPng routing protocol.

FIG. 9 illustrates an example of the default route availability bit and the address generation availability bit expressed using the RTE packet format of the RIPng routing protocol. A specific value is selected from unoccupied values in the RTE metric field or the route tag field of the RIPng protocol in order to indicating whether the pair information is available as a default route. Similarly, a value is determined from unoccupied values in the RTE metric field or the route tag field of the RIPng protocol to indicate whether the address prefix is available information for generating a global address. By setting the specific values, availability of the default route and availability of address generation using the address prefix are represented in the message packet.

In addition, the valid expiration date and the desired expiration date of the address may also be set (by unsigned integers of 32 bits, respectively), as illustrated in FIG. 9, so as to match with the router advertisement of the RFC 2461.

The router, which has acquired the information by the routing protocol, refers to the metric field (in this example) of the RTE packet format. If the default route availability bit indicates the specific value, it means that the information is available as the default route. In this case, the router enters the default route, as well as the next hop (which is generally the source node of the information) and the 48-bit address prefix, in the routing table 53. In general, the default route is treated as a prefix of length 0 in the routing table 53. As many default routes as the number of 48-bit address prefixes can be entered in the routing table 53. If another default route corresponding to the same 48-bit address prefix is already in the routing table 53, then either one having a smaller metric or less cost is chosen as the entry in the routing table 53.

Figure 10:
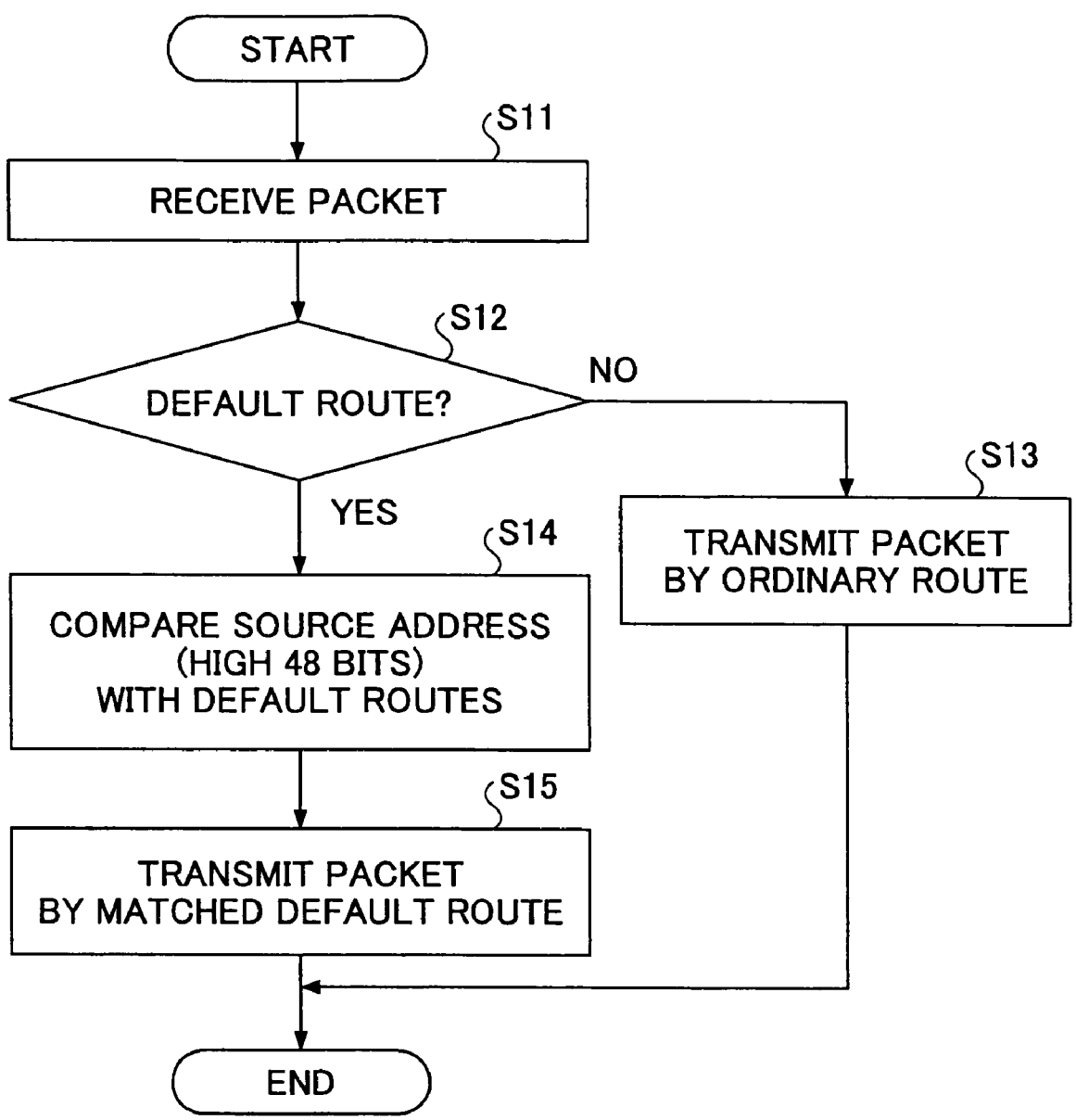
FIG. 10 is a flowchart of the data packet transmitting operations carried out by an in-site router.

FIG. 10 is a flowchart of the data packet transmitting operations carried out by an in-site router. When the adjacent router in the site 10 receives a packet (in step S11), the router searches for the entry that matches the destination address best (longest) from the routing table (step S12). Since a default route has a prefix of length 0, a default route is to be retrieved as the entry with the longest match only if there is no other prefix matching destination address of the packet.

If the retrieved entry is not a default route (NO in S12), then the packet is transmitted by an ordinary route (in step S13). If a default route is retrieved (YES in S12), a default route that is consistent with the higher 48 bits of the source address is selected from all the default routes registered in the routing table (in step S14). Then, the packet is transmitted using the selected default route (in step S15). In this manner, if it is determined that the received packet is to be forwarded using a default route (to the gateway), the router compares the higher 48 bits of the source address with the default route/address prefix pairs registered in the routing table, and forwards the packet to the gateway using a default route matched with the higher 48 bits of the source address.

Although a 48-bit prefix is used in the embodiment, the invention is applicable to any size of prefix. The gateway router and the adjacent routers can operate in the above-described manner even if a different size of prefix is assigned from the ISP. For example, an ISP connected with several higher-layer ISPs may acquire a 40-bit address prefix from each of the higher-layer ISPs, or alternatively, a department belonging to multiple sites may be furnished with a 52-bit prefix by the site manager of each of the sites. In such cases, the system functions in the same way as described above.

In addition, if the address prefix contained in the pair information item distributed by the routing protocol is available information for generating an address, the router that has received the pair information may generate a global address based on the address prefix. The router can also encourage the apparatuses in the site to generate global addresses.

An example of address generation is explained below. A site manager assigns a site local address prefix defined by RFC 3513 to each of the links established in the site in advance. The local address prefix is generally a 64-bit prefix, and the higher 48 bits are FEC0:0000:0000 given in hexadecimal. The remaining 16 bits are set so as to be unique in the site.

Then, the site manager sets a site local address prefix of a target link to be connected, in each interface of a router, and supplies this local address prefix to the hosts in the link using router advertisement.

When the router receives the pair information item by the routing protocol, the router replaces the higher 48 bits of the site local address prefix of each interface to generate a 64-bit address prefix for each link. Then, the generated address prefix is supplied to the hosts located in the link using router advertisement, in a manner adding to the site local address prefix.

A routing protocol is furnished with means for canceling a route. For example, the RIPng protocol cancels a route by setting a value greater than 16 in the metric. Using similar means, the pair information item consisting of the address prefix and the associated default route can be canceled. When receiving a message indicating cancellation of information, the routers and the hosts cancel the designated entry from the routing table or cancel the designated prefix of the corresponding link.

Each apparatus in the site creates an IPv6 address by means of automatic address generation based on router advertisement defined in RFC 2462 or RFC 3041, and can communicate under the created address. When receiving a router advertisement to which a new address prefix is added, the apparatus automatically creates and adds a new address. In this manner, each apparatus can have multiple IPv6 addresses. It is necessary for the apparatus to determine which address is to be used to communicate with an off-site host. The RFC 3484 describes a method for selecting a source address from multiple addresses. Of course, other suitable methods may be used to select an address.

The host 50 can determine priority of source addresses by the following methods, which are techniques other than that disclosed in RFC 3484.
(1) First, the host implements end-to-end delay time measuring tests (ping) for measuring time required for the roundtrip to and from a counterpart host, using multiple source addresses, and selects the fastest one.
(2) Second, the host examines past communication records, and selects an address with a better transmission record.

As has been described above, in the first embodiment, a pair information item consisting of an address prefix and the associated default route is distributed from the gateway router to adjacent (lower layer) routers. The adjacent routers can determined the correspondence between the prefix and the default router, as well as the prefix available in the site, from the distributed message.

The adjacent routers can select an appropriate default route by referring to the source address of the packet. If the source address is based on the prefix assigned by the Internet service provider ISP_a 20 (see FIG. 6), the packet addressed outside the site is transmitted through the ISP_a 20. Similarly, if the source address is based on the prefix assigned by ISP_b 30, the packet addressed outside the site is transmitted through ISP_b 30. By appropriately selecting the source address at the host, the packet is transmitted to a desired Internet service provider corresponding to the prefix, and consequently, the packet transmission efficiency can be improved.

Figure 11:
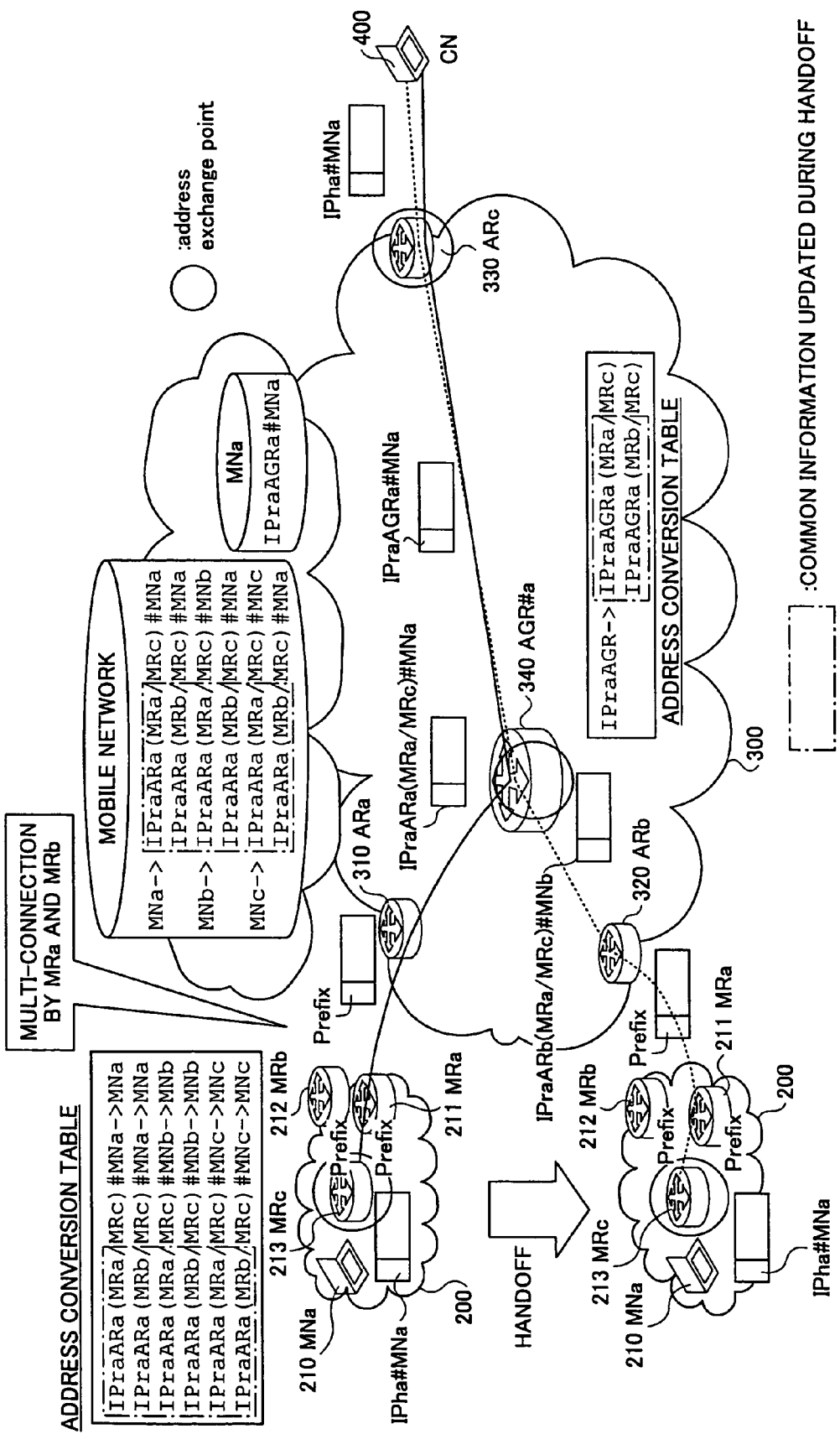
FIG. 11 schematically illustrates a communications system according to the second embodiment of the invention.

FIG. 11 illustrates a communications system according to the second embodiment of the invention. The communications system includes a core network 300 and a mobile network 200. In the core network 300, a mobile managing router AGR#a 340 and access nodes (or access routers) ARa 310 through ARc 330 are arranged. The mobile network 200 includes a mobile node MNa 210 and mobile routers MRa 211 through MRc 213. The mobile network 200 is shifting from connection with the access router ARa 310 to connection with the access router ARb 320 (in the handoff state). The packet is transmitted from the mobile node MNa 210 via the mobile managing router AGR#a 340 to a corresponding node CN 400 connected to the core network 300.

The mobile managing router AGR#a 340 is provided on the packet transmission route which is determined so as not to be redundant, unlike a packet transmission route via a home agent with fixed location.

The mobile network 200 is connected to the core network 300 via mobile routers MRa 211 and MRb 212 in the multi-home state. Another mobile router MRc 213 also exists in the mobile network 200. Prefixes assigned to each mobile node located in the network 200 are supplied from the mobile routers MRa 211 and MRb 212 to the in-site mobile router MRc 213 by the routing protocol and router advertisement. In other words, two common information items IPra are assigned to each mobile node MN. At this time, the associated default routes are also supplied to each mobile node MN.

Each of the core network 300, the mobile network 200, and the mobile node MNa 210 has an address conversion table (or a routing table), as illustrated in FIG. 11. The circles shown in FIG. 11 indicate exchange points, and rectangles depicted by broken lines indicate common information IPra updated during the handoff opration.

Next, explanation is made of operations carried out when a packet is transmitted from the mobile node MNa 210 and operations carried out during handoff of the mobile network 200 to which the mobile node MNa 210 belongs.

When a packet is transmitted from the mobile node MNa 210 in the example shown in FIG. 11, the source address is changed to IPra at the mobile router MRc 213. If the updated address is one assigned from the mobile router MRa 211, the packet is transmitted to the core network 300 via the mobile router MRa 211. If the updated address is one assigned from the mobile router MRb 212, the packet is transmitted to the core network 300 via the mobile router MRb 212. This can be realized by distributing the default route together with the prefix.

When the mobile network 200 in which the mobile node MNa 210 is currently located is conducting handoff, the minimum common portion is updated at each control point. For example, IPraARa(MRa/MRc)#MNa represents the address for mobile node MNa 210 according to the prefix assigned hierarchically to the mobile router MRc 213 from the prefix assigned to the mobile router MRa 211 from the access router ARa 310. When handoff from access router ARa to access router ARb occurs, the prefix assigned to the mobile router MRa 211 is changed to IPraARb(MRa/MRc)#MNa. This means that addressing is conducted such that only the prefix assigned to the MRa 211 is changed, and that the other hierarchical portions are unchanged. In this manner, handoff is realized by the minimum change.

The mobile network 200 under multiconnection with the mobile routers MRa 211 and MRb 212 moves while repeatedly adding and canceling prefixes every time the connection node changes. In such a case, the prefixes have to be controlled in the mobile network 200. In the second embodiment, the mobile router MRc 213 manages the prefixes on the routing table (or the address conversion table) upon receiving prefix messages from the mobile routers MRa 211 and MRb 212. Thus, the prefixes are supplied to each of the mobile routers MRs located in the mobile network 200. With this arrangement, whenever the connection node with the mobile network 200 changes by handover, the prefixes used in this mobile network 200 are changed promptly and appropriately.

Since the communication system illustrated in FIG. 11 does not require an IP tunnel between the mobile network 200 and a connection node (point), workload for resetting the IP tunnel along with the change of connection point during handover is eliminated.

In the above-described example, the present invention is applied to the IP2, which is a network system for supporting a mobile network described in IEICE Technical Report Vol. 103, No. 201, NS-2003-58. However, the present invention is also applicable to the mobile IP.

The prefix/default route pair storing unit 52 functions as a pair information generator (or as pair information generating means). The routing protocol processing unit 51 functions as a pair information distributor (or as pair information distribution means). The routing protocol processing unit 51 and the routing table 53 function as any one or any combination of route setting means, route table setting means, and next hop setting means.

In the second embodiment, the mobile router MRc 213 has prefix updating means that changes only the address prefix hierarchically assigned to a mobile terminal (node) located in the mobile network whenever the connection node changes as the mobile network moves. The mobile routers MRa 211 and MRb 212 located at gateways distribute pair information items of prefixes and default routes to the adjacent mobile router MRc 213 by routing protocol. Although not shown in FIG. 11, the mobile router MR3 213 may also have distribution means that distributes the pair information item of the updated prefix and the default route to the adjacent routers by the routing protocol.

In this manner, the router apparatus can set an appropriate default route in response to the prefix in each source address of a packet. The packet is promptly transmitted to the Internet service provider ISP designated by the prefix. Accordingly, undesirable packet transmission through a redundant route using an IP tunnel, which is a problem in the prior art, can be avoided, and the packet transmission efficiency can be improved.

The entity that assigns a prefix is not limited to Internet service providers. Any bodies (associations, organizations, corporations, etc) that possess prefixes may give the prefixes to the gateway routers. The prefix may be assigned manually, or alternatively, it may be assigned automatically using a server.

This patent application is based on and claims the benefit of the earlier filing date of Japanese Patent Application No. 2003-209144 filed Aug. 27, 2003, the entire contents of which are hereby incorporated by reference.

What is claimed is:

1. A router apparatus used in an IPv6 multihome network and capable of exchanging a network prefix as route information with an adjacent router, the router apparatus comprising:

a communication unit configured to establish a connection between the router apparatus and one of multiple Internet service providers in the IPv6 multihome network;

a pair information generator configured to associate a prefix assigned from the network with a default route to generate a pair information item;

a routing protocol processor configured to exchange the pair information item of the prefix and the associated default route with the adjacent router using a routing protocol; and a routing table configured to set an address generation availability bit which indicates whether an address is to be generated using the prefix and a default route availability bit which indicates whether the pair information item is available as a default route, wherein the routing protocol processor is configured to read the address generation availability bit and the default route availability bit from the routing table, enter the default route in the routing table when the default route availability bit is a first predetermined value, and enter the address in the routing table when the address availability bit is a second predetermined value.

2. The router apparatus of claim 1, wherein the routing protocol processor enters the default route, together with the prefix and a next hop of a packet, in the routing table when the default route availability bit indicates the availability of the default route.

3. The router apparatus of claim 1, wherein the routing protocol processor is configured to check the prefix of a received packet, compare predetermined upper bits of the source address of the received packet with the pair information item if the prefix of the received packet represents the default route, and transmit the received packet to the default route that is consistent with the predetermined upper bits.

4. A method of distributing route information used in an IPv6 multihome network capable of exchanging a prefix as route information among adjacent routers, the method comprising:

establishing a connection between a router apparatus and one of multiple Internet service providers in the IPv6 multihome network;

associating, at the router apparatus, the prefix assigned from the network with a default route to generate a pair information item;

setting, in a routing table at the router apparatus, an address generation availability bit which indicates whether an address is to be generated using the prefix and a default route availability bit which indicates whether the pair information item is available as a default route, including reading the address generation availability bit and the default route availability bit from the routing table, entering the default route in the routing table when the default route availability bit is a first predetermined value, and entering the address in the routing table when the address availability bit is a second predetermined value; and exchanging the pair information item with the adjacent routers using a routing protocol.

5. A communications system including multiple routers in an IPv6 multihome network, the system comprising:

a router apparatus configured to establish a connection to one of multiple Internet service providers in the IPv6 multihome network, receive a prefix from the network, associate the prefix with a default route to generate a pair information item, and exchange the pair information item with an adjacent router, wherein the router apparatus comprises a routing table configured to set an address generation availability bit which indicates whether an address is to be generated using the prefix and a default route availability bit which indicates whether the pair information item is available as a default route, wherein the router apparatus is configured to read the address generation availability bit and the default route availability bit from the routing table, enter the default route in the routing table when the default route availability bit is a first predetermined value, and enter the address in the routing table when the address availability bit is a second predetermined value.

* * * * *